July 11, 1950  J. M. COOK  2,514,936
COOKING STOVE BROILER
Filed June 16, 1947  3 Sheets-Sheet 1

INVENTOR.
James M. Cook
BY
Otto Q. Earl
Attorney.

July 11, 1950          J. M. COOK          2,514,936
COOKING STOVE BROILER
Filed June 16, 1947          3 Sheets-Sheet 2
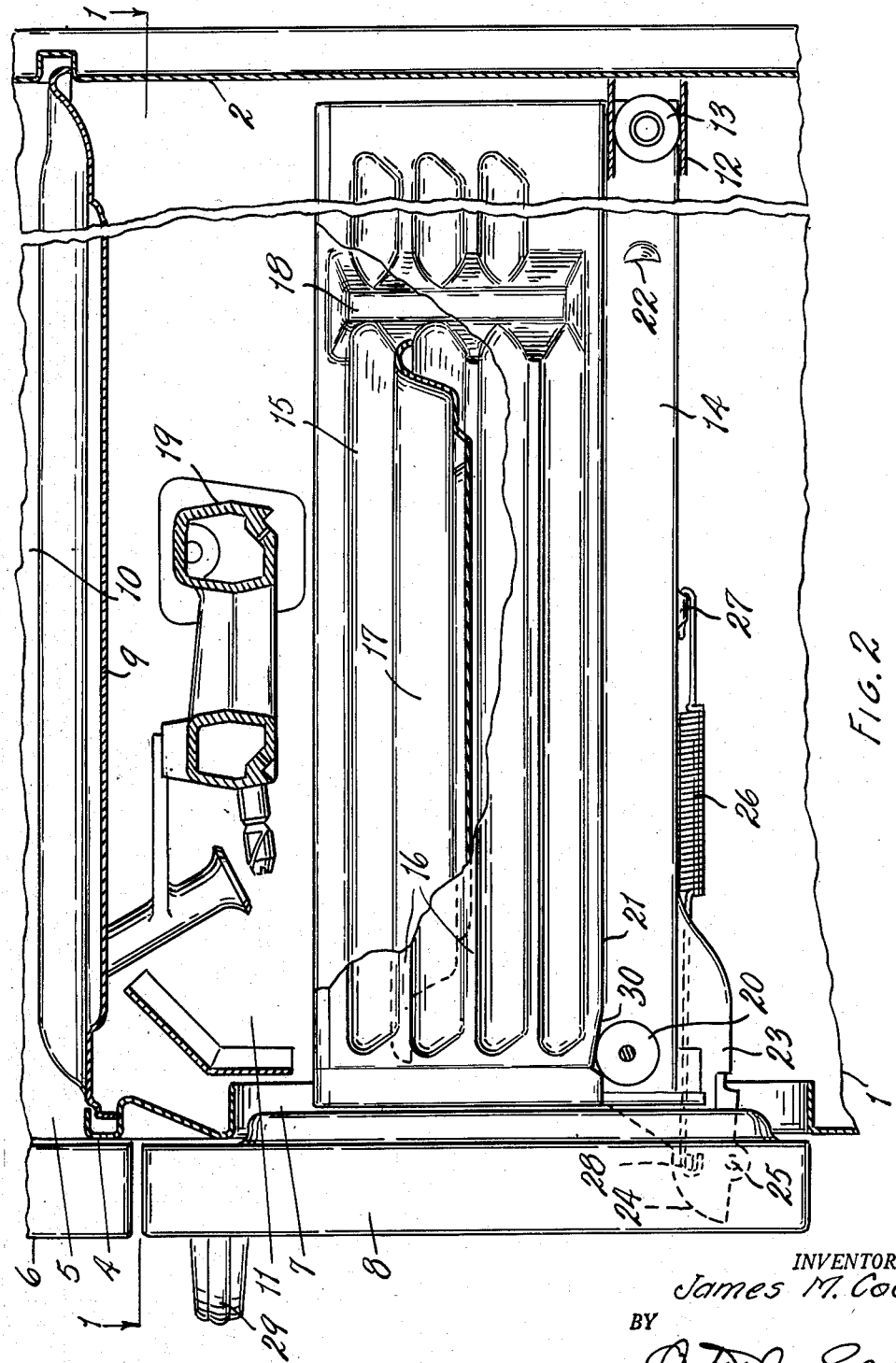
INVENTOR.
James M. Cook
BY
Attorney.

July 11, 1950  J. M. COOK  2,514,936
COOKING STOVE BROILER
Filed June 16, 1947  3 Sheets-Sheet 3
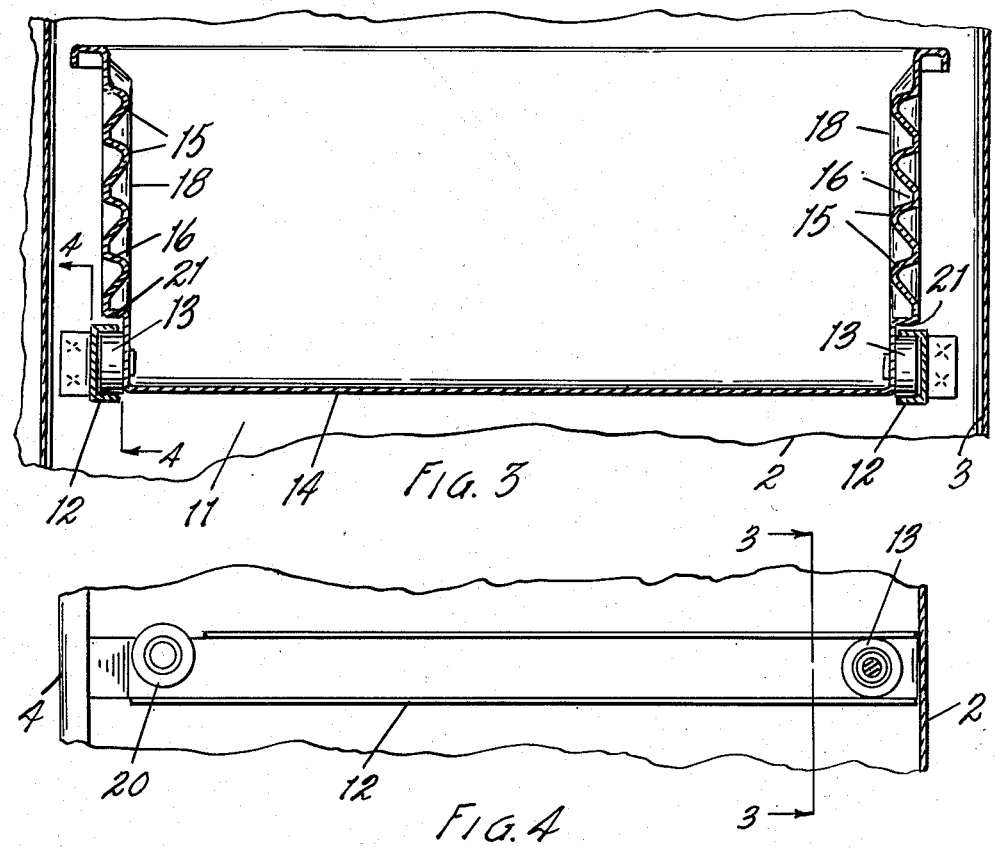
INVENTOR:
James M. Cook
BY
Attorney.

Patented July 11, 1950

2,514,936

UNITED STATES PATENT OFFICE 2,514,936

COOKING STOVE BROILER

James Milton Cook, Kalamazoo, Mich., assignor to Kalamazoo Stove and Furnace Company, Kalamazoo, Mich.

Application June 16, 1947, Serial No. 754,855

2 Claims. (Cl. 126—41)

This invention relates to improvements in a cooking stove broiler.

The principal objects of this invention are:

First, to provide a broiler compartment and food support for a cooking stove in which the food support will support the food directly under the burner and may be easily withdrawn from the broiler compartment and supported outside of the compartment to fully expose the food being cooked.

Second, to arrange a single burner for heating both the oven and broiler compartments of a cooking stove toward the front of the broiler compartment so that when the broiler pan is withdrawn it will fully expose the food therein and still be adequately supported in the compartment.

Third, to provide a broiler body and pan for a cook stove arranged to support food products being cooked in the broiler compartment in the forward portion of the compartment so that partial withdrawal of the broiler body will fully expose the food products for basting or inspecting.

Other objects and advantages relating to the details and economies of the invention will be apparent from the following description and claims.

The drawings, of which there are two sheets, illustrate a preferred arrangement of my broiler chamber, burner element and broiler body in the body of a gas stove.

Fig. 2 is a fragmentary vertical cross sectional view along the line 2—2 in Fig. 1.

Fig. 3 is an enlarged fragmentary transverse vertical section on a line corresponding to line 3—3 of Fig. 4.

Fig. 4 is a fragmentary view partially in vertical section on a line corresponding to the broken line 4—4 of Fig. 3.

Figure 1:
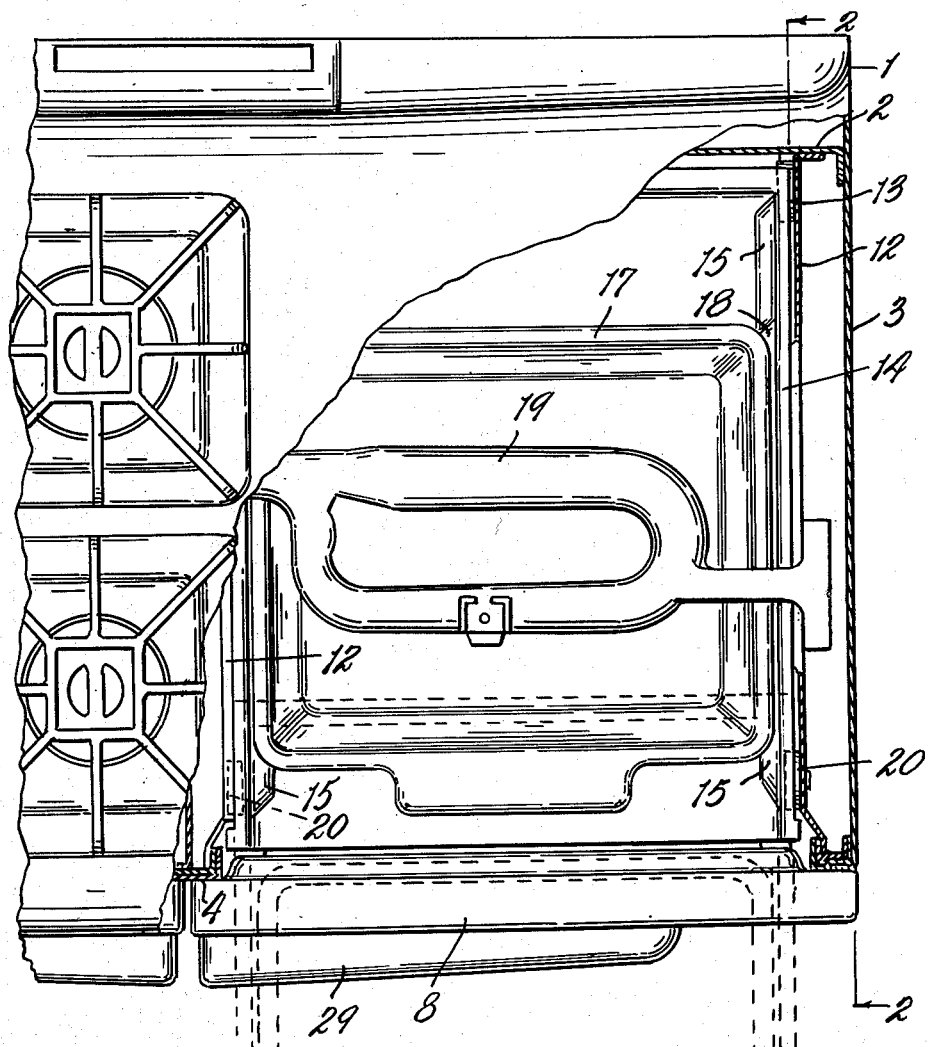
Fig. 1 is a fragmentary plan view of a gas cooking stove partially broken away in horizontal cross section along the line 1—1 in Fig. 2 to illustrate the relative positions of the components of the broiler assembly.

In the past it has been the practice in manufacturing cook stoves to provide an oven compartment positioned above a broiler compartment and to locate a single heating element or gas burner underneath the oven compartment where it would also direct heat into the broiler compartment for broiling foods. These heating elements have universally been disposed longitudinally of the broiler compartment to distribute their heat uniformly from front to rear of the broiler and oven compartments. Thus a broiler pan for supporting food beneath the burner element necessarily had to extend substantially to the back of the broiler compartment in order to take full advantage of the heat of the heating element.

It is my present invention to provide a cook stove with substantially conventional oven and broiler compartments but to provide a heating element which has its major dimension extending transversely of the broiler compartment and which is positioned forwardly of the longitudinal center line of the broiler compartment. By locating the heating element in this position I am able to provide a broiler body which is slidable in and out of the broiler compartment and arranged to support a broiler pan near the front of the broiler compartment. Then when the broiler body is withdrawn from the broiler compartment, it will completely expose the broiler pan while still having a sufficient portion of its length remaining in the broiler compartment to support itself and the broiler pan without complicated levers or slides.

This arrangement of the broiler body, pan and heating element is particularly advantageous in that the food being cooked on the broiler pan may be easily withdrawn for inspection or necessary tending without the danger of coming in contact with any of the heated parts of the broiler body or pan. Then the cook is not required to hold up the front of the broiler pan with one hand and has both hands free to tend the food as desired. As a further feature of my broiler assembly, I mount the door to the broiler compartment on the broiler body so that the cook may open the broiler door and withdraw the broiler body all by movement of a handle positioned on the outside of the broiler door which is not subject to the heat of the compartment.

As a specific example of my stove, I illustrate in the drawings a cook stove 1 having a rear wall 2, side wall 3 and front wall 4. The front wall 4 defines an oven opening 5 closed by the oven door 6 and a broiler opening 7 closed by the broiler door 8. An oven bottom panel 9 separates the oven compartment 10 from the broiler compartment 11. The stove structure thus far described is of more or less standard construction and has therefore not been described in greater detail.

Near the bottom of the broiler compartment 11 and along each side thereof I provide a pair of inwardly opening channel-shaped rail members 12 which form supports and tracks for the rollers 13 secured to the rear end of a broiler body 14. The broiler body is preferably of pressed metal construction covered with a vitreous enamel and is U-shaped in transverse cross section. The side walls of the broiler body are pressed inwardly or embossed with a series of longitudinally extending ribs 15 which form vertically spaced slideways 16 for supporting a broiler pan 17 selectively at a plurality of elevated positions within the broiler body. The side walls of the broiler body are further provided with vertical ribs 18 spaced forwardly from the rear end of the broiler body and forming a stop limiting the rearward motion of the broiler pan in the broiler body.

The vertical ribs 18 are arranged to stop the broiler pan in substantially centered relationship with the burner element 19 when both the broiler body and broiler pan are pushed to their inward limit in the broiler chamber. With reference to Fig. 1 it will be noted that the burner element 19 is of a familiar loop type construction but is disposed with its major axis extending transversely of the broiler chamber and positioned forwardly of the longitudinal center of the broiler chamber.

The forward ends of the rail members 12 rotatably support the fixed rollers 20 which are arranged to engage and support the underside of an overhanging shoulder 21 on the sides of the broiler body 14 so that as the broiler body is withdrawn its forward portion rolls on the rollers 20 and its rear portion is supported on the rolls 13 rolling on the rail members 12. Stop abutments 22 are pressed outwardly from the sides of the broiler body to engage the rollers 20 to limit the outward movement of the broiler body. It will be noted that the abutments 22 are located slightly to the rear of the vertical ribs 18 so that the broiler body may be withdrawn from the broiler chamber until the ribs 18 and broiler pan 17 have substantially cleared the broiler opening 7 in the front wall of the stove. In this position the broiler body is still adequately supported in a horizontal position by engagement of the rollers 13 within the channel-shaped cross section of the side rails 12.

The lower front corners of the broiler body are provided with forwardly extending brackets 23 having arcuate hinge portions 24 which are supported from the broiler body and arranged to extend through the rear wall of the broiler compartment door 8. The hinge portions 24 define holes 25 for receiving pins hingedly supporting the door on the brackets. A coil spring 26 is provided between a hook 27 on the bottom of the broiler body and a hook 28 on the door for urging the door to closed position.

With the arrangement of parts thus described the cook may grasp the handle 29 of the broiler compartment door and by pulling outwardly withdraw the broiler body and broiler pan from the broiler chamber. The broiler body and broiler pan may be extended to the position illustrated by the dotted lines in Fig. 1 where the broiler pan and its contents are fully exposed for easy tending. If the cook desires to merely look into the broiler chamber she may pull down the broiler door 8 against the tension of the spring 26 by applying an outward and downward pressure to the handle 29 as distinguished from a straight outward pull to remove the broiler body from the broiler chamber. It will be noted that the overhanging shoulders 21 on the broiler body are sloped slightly upwardly at 30 to form shallow notches engaging the rollers 20 when the broiler body is fully retracted into the broiler chamber. These notches prevent the broiler body from rolling out of the broiler chamber unintentionally and permit the broiler door to be opened easily without simultaneously withdrawing the broiler body.

I have thus described a highly practical commercial embodiment of my broiler arrangement so that others may reproduce the same without further disclosure. I have not attempted to illustrate possible minor changes in the details of construction as it is believed that others skilled in the art may adapt my broiler arrangement to various types of stoves without further disclosure.

Having thus described my invention, what I claim as new and desire to secure by Letters Patent, is:

1. In combination with a cook stove having a broiler compartment, a broiler body of U-shaped cross section and having inwardly offset portions forming overhanging shoulders along the bottom of each side thereof, support rails of channel-shaped cross section extending along the sides of said compartment, rollers secured to the fronts of said rails and engageable with the top walls of said shoulders to support the front of said body, said shoulders having upturned portions at the front ends thereof to form locating detents for said body, other rollers secured directly to the side walls of said shoulders at the rear of said body and engageable with said support rails between the flanges thereof, stops pressed from the side of said body and spaced from the rear thereof to engage said first rollers to limit outward movement of said body, hinge brackets secured to the bottom of said body member inwardly of said shoulder and projecting forwardly therefrom, and a door having the projecting portions of said brackets pivotally connected thereto.

2. In combination with a cook stove having a broiler compartment, a broiler body of U-shaped cross section and having inwardly offset portions forming overhanging shoulders along the bottom of each side thereof, support rails of channel-shaped cross section extending along the sides of said compartment, rollers secured to the fronts of said rails and engageable with the top walls of said shoulders to support the front of said body, said shoulders having upturned portions at the front ends thereof to form locating detents for said body, other rollers secured directly to the side walls of said shoulders at the rear of said body and engageable with said support rails between the flanges thereof, and stops pressed from the sides of said shoulders and spaced from the rear thereof to engage said first rollers to limit outward movement of said body.

JAMES MILTON COOK.

REFERENCES CITED

The following references are of record in the file of this patent:

UNITED STATES PATENTS

| Number | Name | Date |
| --- | --- | --- |
| 1,172,711 | Hunter | Feb. 22, 1916 |
| 1,191,198 | Kuhn | July 18, 1916 |
| 1,748,194 | Smith | Feb. 25, 1930 |
| 1,941,541 | Dibble | Jan. 2, 1934 |
| 2,029,718 | Hodson | Feb. 4, 1936 |
| 2,132,737 | Kahn | Oct. 11, 1938 |
| 2,133,835 | Sherman et al. | Oct. 18, 1938 |
| 2,155,654 | Haley | Apr. 25, 1939 |
| 2,423,863 | Wales | July 15, 1947 |